United States Patent
Kim et al.

(10) Patent No.: US 10,211,967 B2
(45) Date of Patent: *Feb. 19, 2019

(54) METHOD FOR TRANSMITTING AND RECEIVING SIGNAL ON BASIS OF DYNAMIC CHANGE IN WIRELESS RESOURCE IN WIRELESS COMMUNICATION SYSTEM TO WHICH CARRIER AGGREGATION SCHEME IS APPLIED, AND DEVICE THEREFORE

(71) Applicant: LG ELECTRONICS INC., Seoul (KR)

(72) Inventors: Myoungseob Kim, Anyang-si (KR); Hanbyul Seo, Anyang-si (KR); Hakseong Kim, Anyang-si (KR); Seungmin Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/714,972

(22) Filed: Sep. 25, 2017

(65) Prior Publication Data

US 2018/0026774 A1    Jan. 25, 2018

Related U.S. Application Data

(63) Continuation of application No. 14/382,705, filed as application No. PCT/KR2013/002101 on Mar. 15, 2013, now Pat. No. 9,806,875.

(Continued)

(51) Int. Cl.
*H04L 5/14* (2006.01)
*H04J 3/10* (2006.01)
(Continued)

(52) U.S. Cl.
CPC ......... *H04L 5/1438* (2013.01); *H04B 7/2656* (2013.01); *H04J 3/10* (2013.01);
(Continued)

(58) Field of Classification Search
None
See application file for complete search history.

(56) References Cited

U.S. PATENT DOCUMENTS

2009/0180435 A1    7/2009  Sarkar
2011/0211503 A1    9/2011  Che et al.
(Continued)

FOREIGN PATENT DOCUMENTS

CN    101617489    12/2009
CN    102204154     9/2011
(Continued)

OTHER PUBLICATIONS

PCT International Application No. PCT/KR2013/002101, Written Opinion of the International Searching Authority dated Jul. 26, 2013, 19 pages.

(Continued)

*Primary Examiner* — George C Atkins
(74) *Attorney, Agent, or Firm* — Lee Hong Degerman Kang & Waimey

(57) ABSTRACT

A method for transmitting and receiving a signal by a terminal in a wireless communication system is disclosed in the present invention. More particularly, the method comprises the steps of: receiving an indicator for changing the usage of a specific subframe corresponding to a sub-component carrier from a network; determining whether near-end crosstalk between the sub-component carrier and another component carrier occurs if the usage of the subframe is changed according to the indicator; and transmitting and receiving a signal to and from the network through the (Continued)

sub-component carrier according to the changed usage if it is determined that the near-end crosstalk does not occur.

12 Claims, 13 Drawing Sheets

Related U.S. Application Data

(60) Provisional application No. 61/613,487, filed on Mar. 20, 2012, provisional application No. 61/765,791, filed on Feb. 17, 2013.

(51) Int. Cl.
*H04L 5/00* (2006.01)
*H04W 72/04* (2009.01)
*H04B 7/26* (2006.01)
*H04J 11/00* (2006.01)

(52) U.S. Cl.
CPC .......... *H04L 5/0048* (2013.01); *H04L 5/0094* (2013.01); *H04L 5/1469* (2013.01); *H04W 72/042* (2013.01); *H04J 11/0023* (2013.01); *H04L 5/001* (2013.01); *H04L 5/0044* (2013.01); *H04L 5/0066* (2013.01)

(56) References Cited

U.S. PATENT DOCUMENTS

| | | | |
|---|---|---|---|
| 2012/0213170 A1 | 8/2012 | Choi et al. | |
| 2013/0010659 A1 | 1/2013 | Chen et al. | |
| 2014/0334355 A1* | 11/2014 | Ekpenyong | H04B 1/56 |
| | | | 370/280 |
| 2015/0023145 A1 | 1/2015 | Kim et al. | |

FOREIGN PATENT DOCUMENTS

| | | |
|---|---|---|
| KR | 10-2011-0007064 | 1/2011 |
| KR | 10-2011-0055014 | 5/2011 |
| KR | 10-2011-0082725 | 7/2011 |
| WO | 2010049587 | 5/2010 |
| WO | 2010143821 | 12/2010 |

OTHER PUBLICATIONS

PCT International Application No. PCT/KR2013/002101, Written Opinion of the International Searching Authority dated Jul. 26, 2013, 1 page.

State Intellectual Property Office of the People's Republic of China Application Serial No. 201380015290.0, Office Action dated Dec. 19, 2016, 17 pages.

\* cited by examiner

FIG. 2
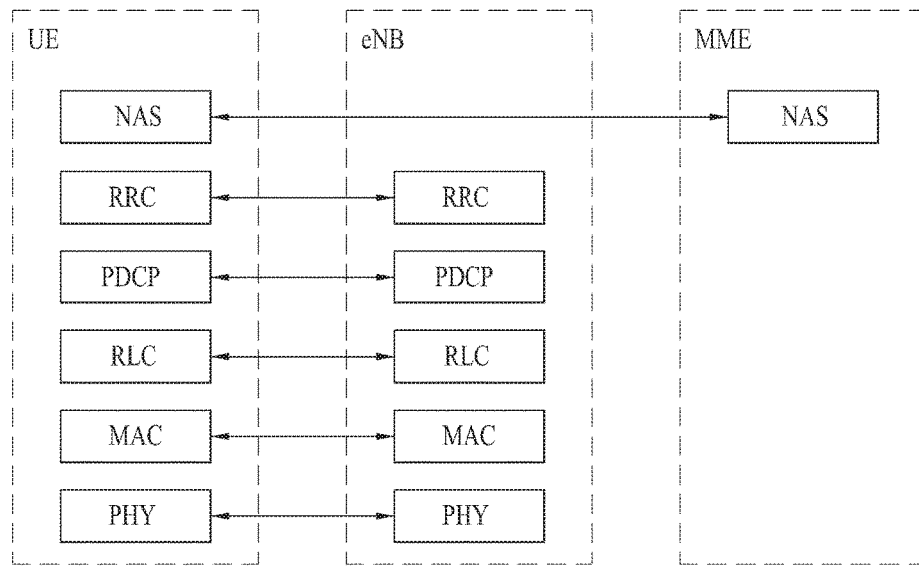
(a) CONTROL-PLANE PROTOCOL STACK
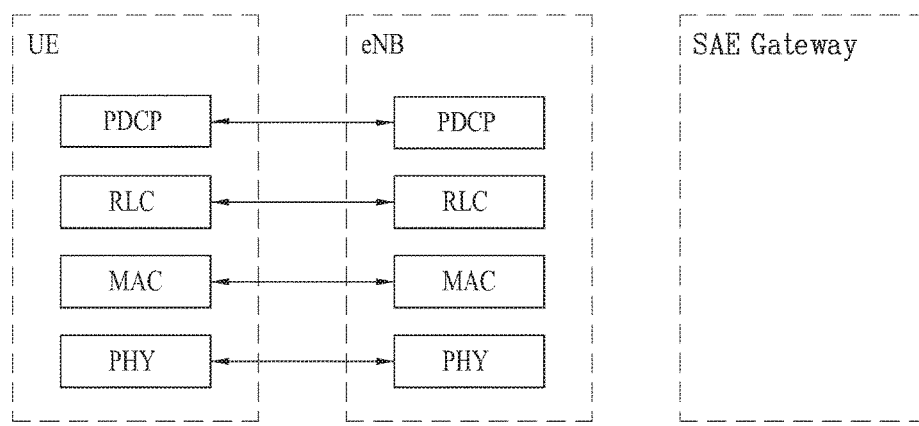
(b) USER-PLANE PROTOCOL STACK FIG. 12
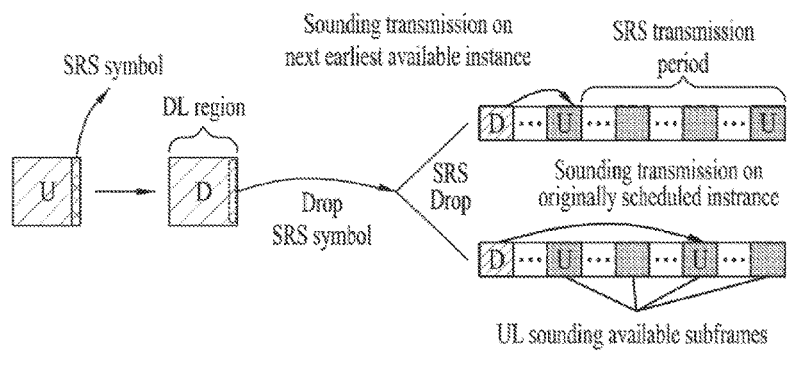
(a) Dropping SRS symbol
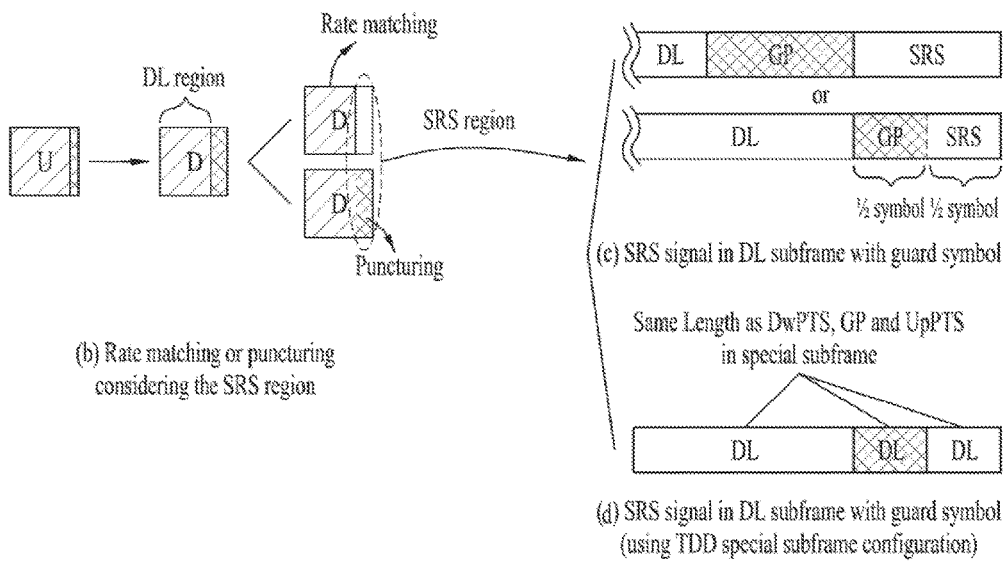
(b) Rate matching or puncturing considering the SRS region
(c) SRS signal in DL subframe with guard symbol
(d) SRS signal in DL subframe with guard symbol (using TDD special subframe configuration)

METHOD FOR TRANSMITTING AND RECEIVING SIGNAL ON BASIS OF DYNAMIC CHANGE IN WIRELESS RESOURCE IN WIRELESS COMMUNICATION SYSTEM TO WHICH CARRIER AGGREGATION SCHEME IS APPLIED, AND DEVICE THEREFORE

CROSS-REFERENCE TO RELATED APPLICATIONS

This application is a continuation application of U.S. patent application Ser. No. 14/382,705, filed on Sep. 3, 2014, now U.S. Pat. No. 9,806,875, which is the National Stage filing under 35 U.S.C. 371 of International Application No. PCT/KR2013/002101, filed on Mar. 15, 2013, which claims the benefit of U.S. Provisional Application Nos. 61/613,487, filed on Mar. 20, 2012, and 61/765,791, filed on Feb. 17, 2013, the contents of which are all hereby incorporated by reference herein in their entirety.

TECHNICAL FIELD

The present invention relates to a wireless communication system, and more particularly, to a method and apparatus for transmitting and receiving a signal based on dynamic change in a radio resource in a wireless communication system to which a carrier aggregation scheme is applied.

BACKGROUND ART

As an example of a wireless communication system to which the present invention is applicable, a 3$^{rd}$ generation partnership project (3GPP) long term evolution (LTE) communication system will be schematically described.

FIG. 1 is a diagram showing a network structure of an evolved universal mobile telecommunications system (E-UMTS) as a mobile communication system. The E-UMTS is an evolved form of the UMTS and has been standardized in the 3GPP. Generally, the E-UMTS may be called a long term evolution (LTE) system. For details of the technical specifications of the UMTS and E-UMTS, refer to Release 7 and Release 8 of "3$^{rd}$ generation partnership project; technical specification group radio access network".

Referring to FIG. 1, the E-UMTS mainly includes a user equipment (UE), base stations (or eNBs or eNode Bs), and an Access Gateway (AG) which is located at an end of a network (E-UTRAN) and which is connected to an external network. Generally, an eNB can simultaneously transmit multiple data streams for a broadcast service, a multicast service and/or a unicast service.

One or more cells may exist per eNB. The cell is set to use a bandwidth such as 1.25, 2.5, 5, 10, 15 or 20 MHz to provide a downlink or uplink transmission service to several UEs. Different cells may be set to provide different bandwidths. The eNB controls data transmission or reception of a plurality of UEs. The eNB transmits downlink (DL) scheduling information of DL data so as to inform a corresponding UE of time/frequency domain in which data is transmitted, coding, data size, and hybrid automatic repeat and request (HARQ)-related information. In addition, the eNB transmits uplink (UL) scheduling information of UL data to a corresponding UE so as to inform the UE of a time/frequency domain which may be used by the UE, coding, data size and HARQ-related information. An interface for transmitting user traffic or control traffic can be used between eNBs. A Core Network (CN) may include the AG and a network node or the like for user registration of the UE. The AG manages mobility of a UE on a Tracking Area (TA) basis. One TA includes a plurality of cells.

Although wireless communication technology has been developed up to long term evolution (LTE) based on wideband code division multiple access (WCDMA), the demands and the expectations of users and providers continue to increase. In addition, since other radio access technologies have been continuously developed, new technology evolution is required to secure high competitiveness in the future. Decrease in cost per bit, increase in service availability, flexible use of a frequency band, simple structure, open interface, suitable user equipment (UE) power consumption and the like are required.

DISCLOSURE

Technical Problem

An object of the present invention devised to solve the problem lies in a method and apparatus for transmitting and receiving a signal based on dynamic change in a radio resource in a wireless communication system to which a carrier aggregation scheme is applied.

Technical Solution

The object of the present invention can be achieved by providing a method for transmitting and receiving a signal by a user equipment (UE) in a wireless communication system, the method including receiving an indicator for changing use of a specific subframe corresponding to a secondary component carrier, from a network, determining whether near-end crosstalk with the secondary component carrier or another component carrier occurs when use of the subframe is changed according to the indicator, and transmitting and receiving a signal to and from the network through the secondary component carrier according to the changed use when it is determined that the near-end crosstalk does not occur.

The method may further include receiving downlink scheduling information of the specific subframe corresponding to the secondary component carrier, on the specific subframe corresponding to a primary component carrier, from the network, when the use is changed to downlink from uplink.

The method may further include receiving uplink scheduling information of the specific subframe corresponding to the secondary component carrier through the primary component carrier, prior to the specific subframe, wherein a carrier indicator field included in the uplink scheduling information is set as a specific value for detection of error.

The method may further include transmitting and receiving a signal to and from the network according to original use of the specific subframe through the secondary component carrier when it is determined that near-end crosstalk occurs. In this case, the method may further include receiving downlink scheduling information of the specific subframe corresponding to the secondary component carrier, on the specific subframe corresponding to the primary component carrier, from the network when the indicator indicates change in use to downlink from uplink, wherein a carrier indicator field included in the downlink scheduling information is set as a specific value for detection of error. In addition, use of the specific subframe transmitted and received through the secondary component carrier is dependently changed upon use of the specific subframe corresponding to a primary component carrier when it is determined that the near-end crosstalk occurs. In this case, method may further include receiving an indicator for changing use of a specific subframe corresponding to the primary component carrier, from the network.

When the specific subframe is an uplink subframe in which a sounding reference signal is transmitted and the indicator indicates change in use to downlink from uplink, a sounding reference signal is transmitted in a last symbol of the specific subframe. A symbol prior to the last symbol is configured as a guard period for switching between downlink/uplink. In this case, the indicator may be special subframe configuration information.

The special subframe may be an uplink subframe in which a sounding reference signal is transmitted, and when the indicator indicates change in use to downlink from uplink, a last symbol on the specific subframe may include a guard period for swathing between downlink/uplink and a period in which a sounding reference signal is transmitted.

The method may further include transmitting a response signal for the indicator, to the network. Furthermore, the wireless communication system may be a time division duplex (TDD) system.

Advantageous Effects

An embodiment of the present invention, a user equipment (UE) and an eNB can effectively transmit and receive a signal while dynamically changing a radio resource in a wireless communication system to which a carrier aggregation scheme is applied.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

FIG. 2 shows a control plane and a user plane of a radio interface protocol between a UE and an evolved universal terrestrial radio access network (E-UTRAN) based on a 3GPP radio access network standard.

FIG. 12 is a diagram for explanation of processing of an SRS when use of a subframe is changed according to a third embodiment of the present invention.

BEST MODE

Figure 1:
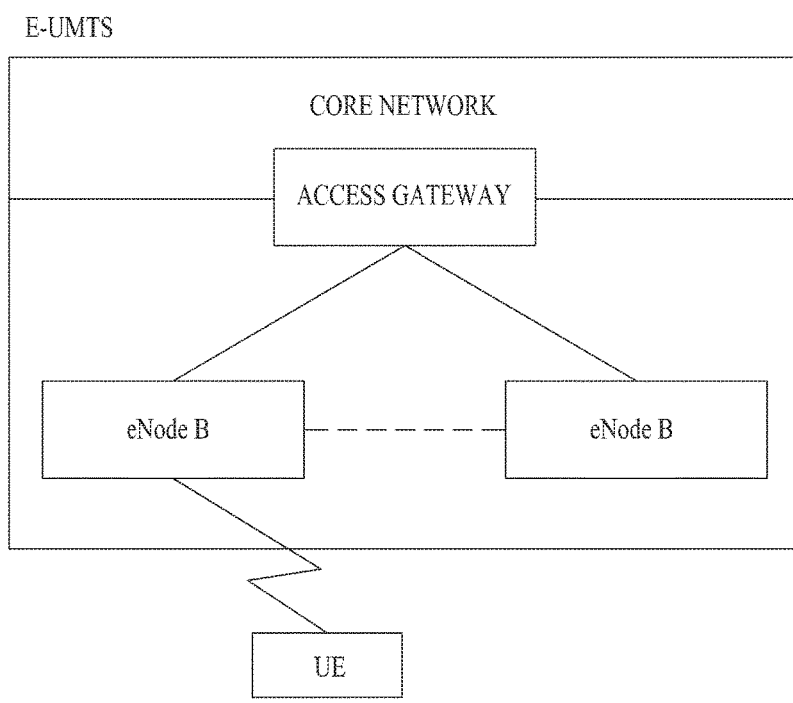
FIG. 1 is a diagram showing a network structure of an evolved universal mobile telecommunications system (E-UMTS) as a mobile communication system.

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although, for convenience, the embodiments of the present invention are described using the LTE system and the LTE-A system in the present specification, the embodiments of the present invention are applicable to any communication system corresponding to the above definition.

FIG. 2 shows a control plane and a user plane of a radio interface protocol between a UE and an evolved universal terrestrial radio access network (E-UTRAN) based on a 3GPP radio access network standard. The control plane refers to a path used for transmitting control messages used for managing a call between the UE and the network. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on a higher layer via a transport channel Data is transported between the MAC layer and the PHY layer via the transport channel Data is also transported between a physical layer of a transmitting side and a physical layer of a receiving side via a physical channel. The physical channel uses a time and a frequency as radio resources. More specifically, the physical channel is modulated using an orthogonal frequency division multiple access (OFDMA) scheme in downlink and is modulated using a single-carrier frequency division multiple access (SC-FDMA) scheme in uplink.

A medium access control (MAC) layer of a second layer provides a service to a radio link control (RLC) layer of a higher layer via a logical channel. The RLC layer of the second layer supports reliable data transmission. The function of the RLC layer may be implemented by a functional block within the MAC. A packet data convergence protocol (PDCP) layer of the second layer performs a header compression function to reduce unnecessary control information for efficient transmission of an Internet Protocol (IP) packet such as an IPv4 packet or an IPv6 packet in a radio interface having a relatively small bandwidth.

A radio resource control (RRC) layer located at the bottom of a third layer is defined only in the control plane and is responsible for control of logical, transport, and physical channels in association with configuration, re-configuration, and release of radio bearers (RBs). The RB is a service that the second layer provides for data communication between the UE and the network. To accomplish this, the RRC layer of the UE and the RRC layer of the network exchange RRC messages. If an RRC connection is established between the UE and the E-UTRAN, the UE is in RRC Connected mode and otherwise, the UE is in RRC idle mode. A non-access stratum (NAS) layer above the RRC layer performs functions including session management and mobility management.

One cell of the eNB is set to use a bandwidth such as 1.25, 2.5, 5, 10, 15, or 20 MHz to provide a downlink or uplink transmission service to several UEs. Different cells may be set to provide different bandwidths.

Downlink transport channels for transmission of data from the network to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through a downlink SCH and may also be transmitted through a downlink multicast channel (MCH). Uplink transport channels for transmission of data from the UE to the network include a random access channel (RACH) for transmission of initial control messages and an uplink SCH for transmission of user traffic or control messages. Logical channels, which are located above the transport channels and are mapped to the transport channels, include a broadcast control channel (BCCH), a paging control channel (PCCH), a common control channel (CCCH), a multicast control channel (MCCH), and a multicast traffic channel (MTCH).

Figure 3:
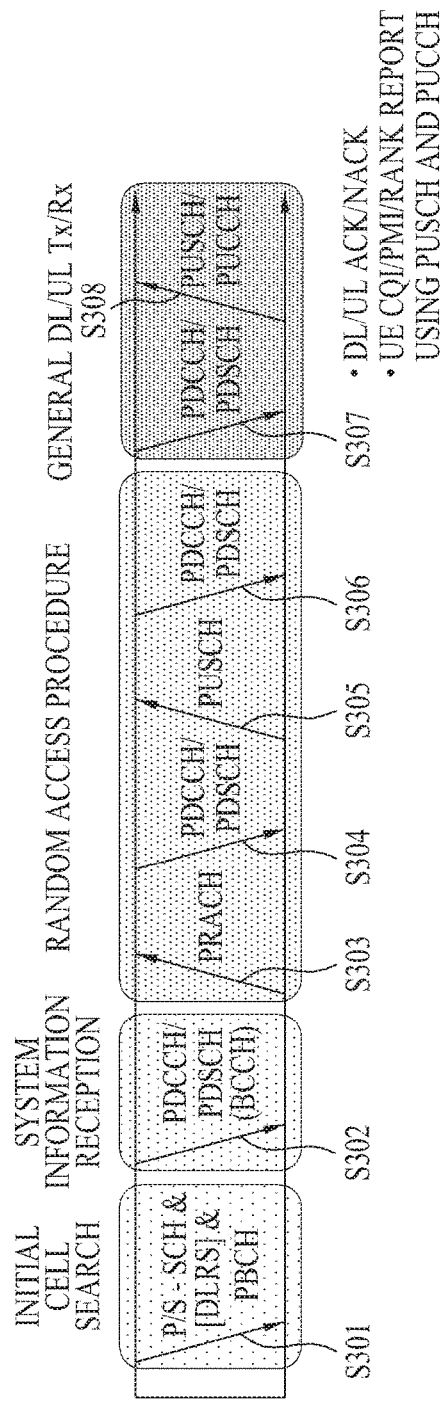
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). The UE may receive a primary synchronization channel (P-SCH) and a secondary synchronization channel (S-SCH) from the eNB, perform synchronization with the eNB, and acquire information such as a cell ID. Thereafter, the UE may receive a physical broadcast channel from the eNB so as to acquire broadcast information within the cell. Meanwhile, the UE may receive a downlink reference signal (DL RS) so as to confirm a downlink channel state in the initial cell search step.

The UE which completes the initial cell search may receive a physical downlink control channel (PDCCH) and a physical downlink shared channel (PDSCH) according to information included in the PDCCH so as to acquire more detailed system information (S302).

Meanwhile, if the eNB is initially accessed or radio resources for signal transmission are not present, the UE may perform a random access procedure (RACH) (step S303 to S306) with respect to the eNB. In this case, the UE may transmit a specific sequence through a physical random access channel (PRACH) as a preamble (S303 and S305), and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and physical uplink shared channel (PUSCH)/physical uplink control channel (PUCCH) transmission (S308) as a general uplink/downlink signal transmission procedure. In particular, the UE receives downlink control information (DCI) via a PDCCH. The DCI includes control information such as resource allocation information of the UE and the format thereof is changed according to use purpose.

The control information transmitted from the UE to the eNB in uplink or transmitted from the eNB to the UE in downlink includes a downlink/uplink ACK/NACK signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
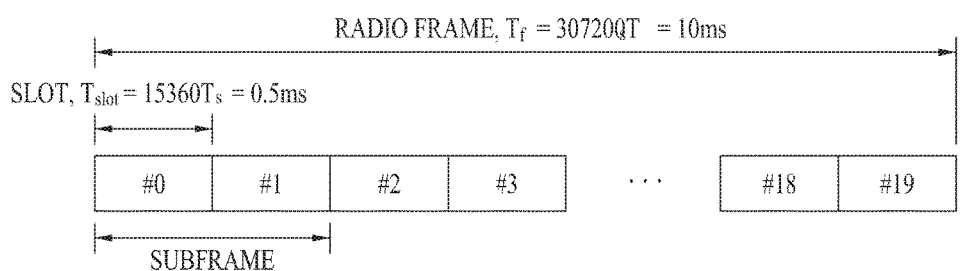
FIG. 4 illustrates an exemplary control channel included in the control region of a subframe in a radio frame.

FIG. 4 is a diagram showing the structure of a radio frame used in a Long Term Evolution (LTE) system.

Referring to FIG. 4, the radio frame has a length of 10 ms ($327200 \times T_s$) and includes 10 subframes with the same size. Each of the subframes has a length of 1 ms and includes two slots. Each of the slots has a length of 0.5 ms ($15360 \times T_s$). $T_s$ denotes a sampling time, and is represented by $T_s=1/(15 \text{ kHz} \times 2048)=3.2552 \times 10^{-8}$ (about 33 ns). Each slot includes a plurality of OFDM symbols in a time domain, and includes a plurality of resource blocks (RBs) in a frequency domain. In the LTE system, one RB includes 12 subcarriers×7(6) OFDM or SC-FDMA symbols. A transmission time interval (TTI) which is a unit time for transmission of data may be determined in units of one or more subframes. The structure of the radio frame is only exemplary and the number of subframes included in the radio frame, the number of slots included in the subframe, or the number of OFDM or SC-FDMA symbols included in the slot may be variously changed.

Figure 5:
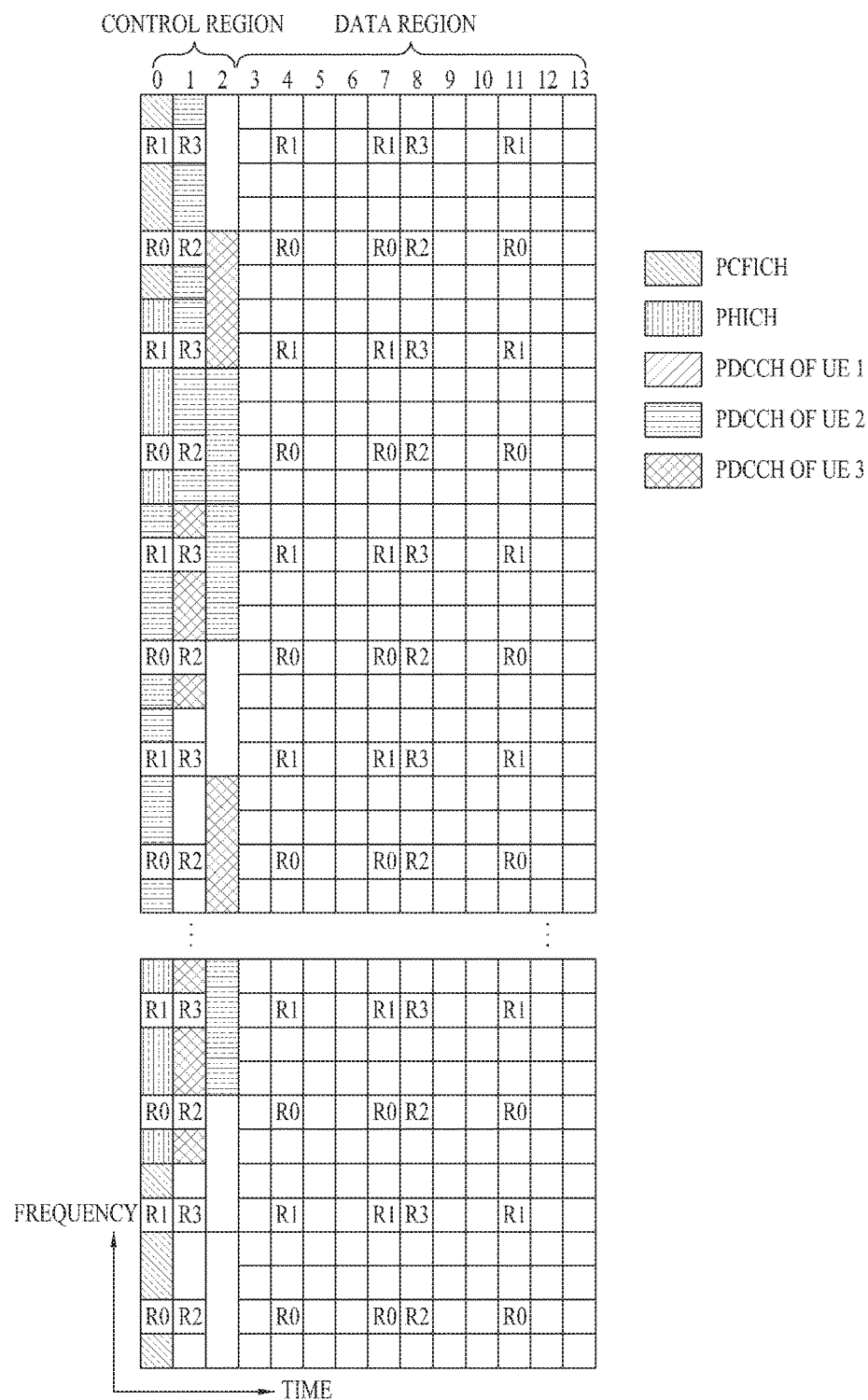
FIG. 5 illustrates a structure of a downlink (DL) subframe in an LTE system.

FIG. 5 illustrates an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a physical control format indicator channel (PCFICH), a physical hybrid-arq indicator channel (PHICH), a physical downlink control channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 resource element groups (REGs), each REG being distributed to the control region based on a cell identity (ID). One REG includes 4 resource elements (REs). An RE is a minimum physical resource defined by one subcarrier by one OFDM symbol. The PCFICH indicates 1 to 3 or 2 to 4 according to a bandwidth. The PCFICH is modulated in quadrature phase shift keying (QPSK).

The PHICH is a physical hybrid-automatic repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in binary phase shift keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Here, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the cyclic redundancy check (CRC) of a specific PDCCH is masked by radio network temporary identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
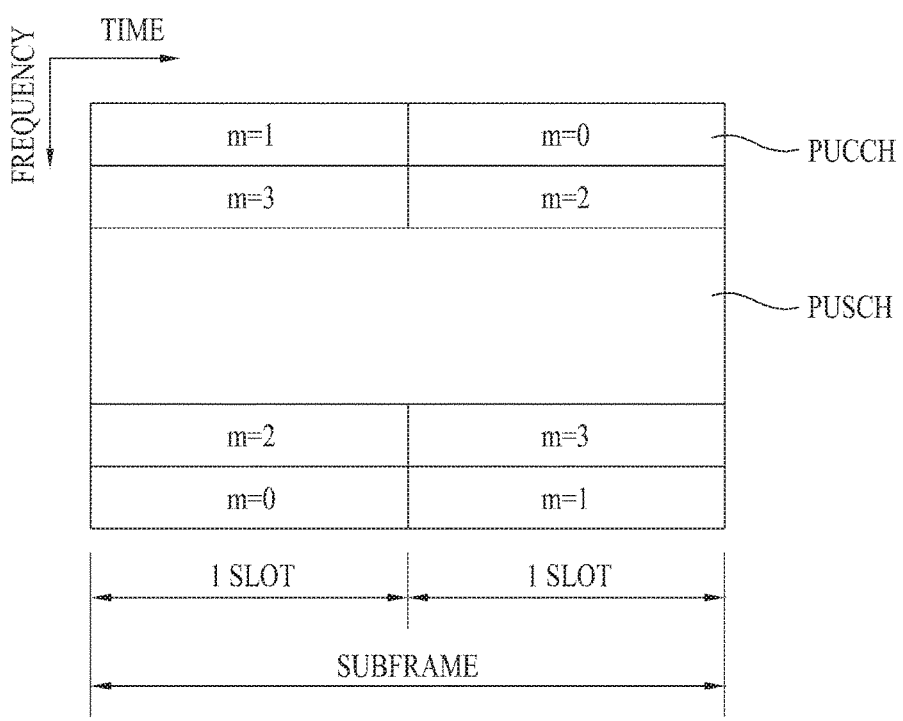
FIG. 6 illustrates a structure of an uplink (UL) subframe in an LTE system.

FIG. 6 illustrates a structure of a UL subframe in the LTE system.

Referring to FIG. 6, a UL subframe may be divided into a control region and a data region. A physical uplink control channel (PUCCH) including uplink control information (UCI) is allocated to the control region and a physical uplink shared channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for multiple input multiple output (MIMO), a scheduling request (SR) requesting UL resource allocation. A PUCCH for one UE occupies one resource block (RB) having a different frequency in each slot of a subframe. That is, the two RBs allocated to the PUCCH frequency-hop over the slot boundary of the subframe. Particularly, PUCCHs with m=0, m=1, m=2, and m=3 are allocated to a subframe in FIG. 6.

Figure 7:
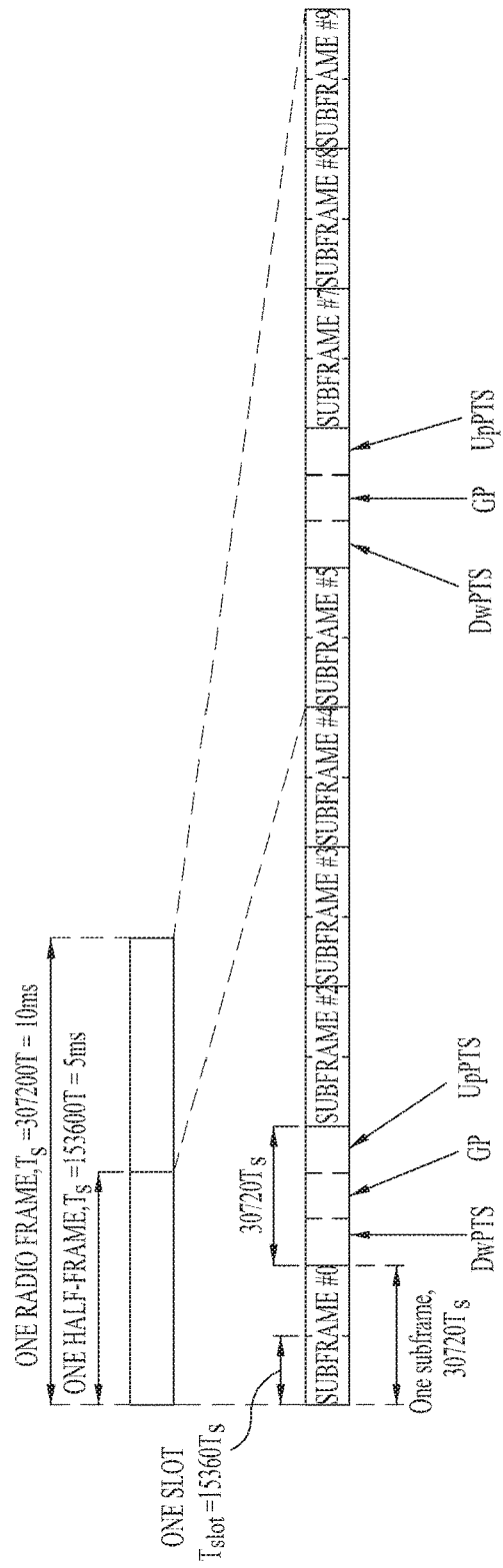
FIG. 7 illustrates a structure of a radio frame in an LTE TDD system.

FIG. 7 illustrates a structure of a radio frame in an LTE TDD system. In the LTE TDD system, a radio frame includes two half frames, and each half frame includes four normal subframes each including two slots, and a special subframe including a downlink pilot time slot (DwPTS), a guard period (GP), and an uplink pilot time slot (UpPTS).

In the special subframe, the DwPTS is used for initial cell search, synchronization, or channel estimation in a UE. The UpPTS is used for channel estimation in an eNB and uplink transmission synchronization of a UE. That is, the DwPTS is used for downlink transmission and the UpPTS is used for uplink transmission. In particular, the UpPTS is used for transmission of a PRACH preamble or SRS. In addition, the GP is a period for removing interference generated in uplink due to multipath delay of a downlink signal between uplink and downlink.

Special subframe configuration is defined in the current 3GPP standard document as shown in [Table 2] below. In [Table 2], $T_s1/(15000 \times 2048)$ refers to a DwPTS and a UpPTS and the remaining region is configured as a GP.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Meanwhile, in an LTE TDD system, a UL/DL configuration is shown in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In [Table 2] above, D, U, and S refer to a downlink subframe, an uplink subframe, and the special subframe. In addition, [Table 3] also shows downlink-to-uplink switch-point periodicity in an uplink/downlink subframe configuration in each system.

Hereinafter, a carrier aggregation scheme will be described.

Figure 8:
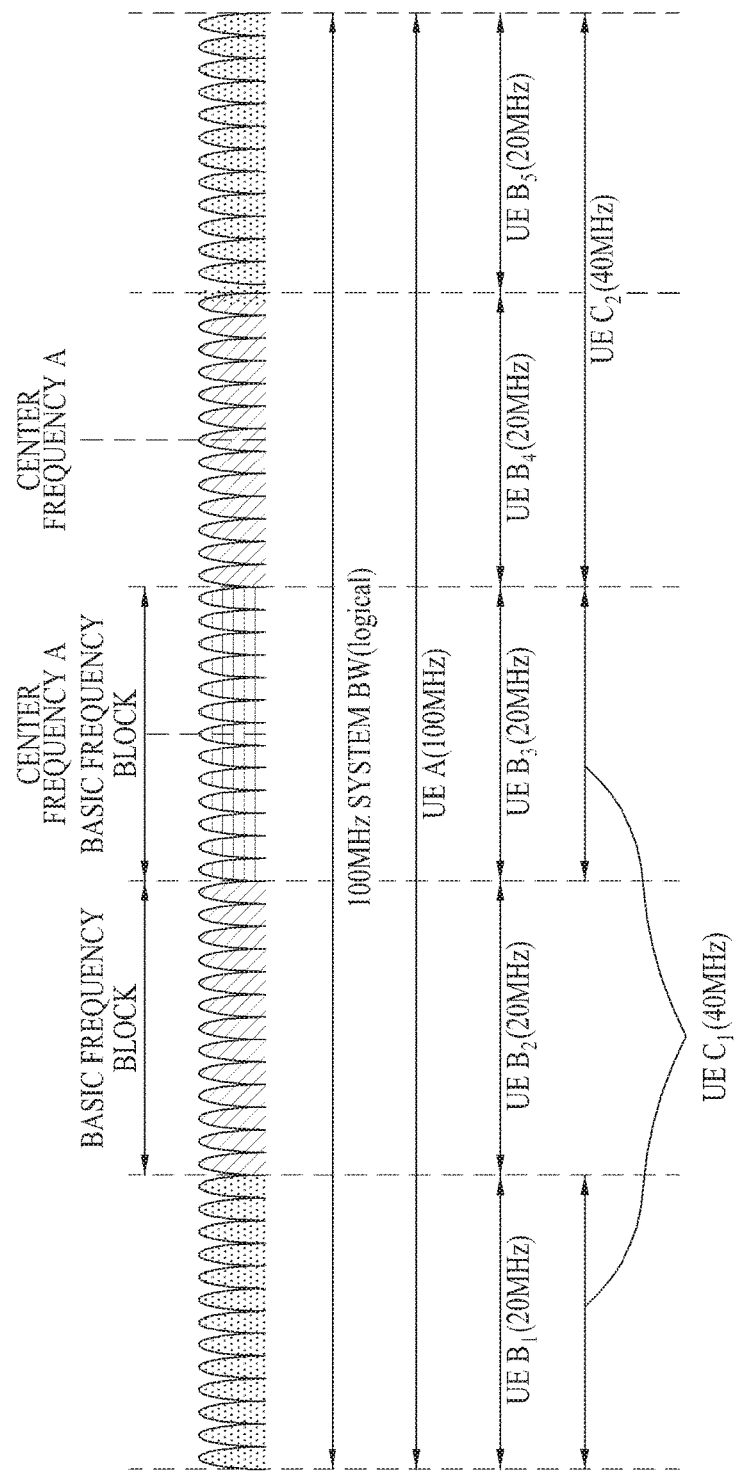
FIG. 8 is a view illustrating concept of a carrier aggregation scheme.

FIG. 8 is a view illustrating concept of a carrier aggregation scheme.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' will consistently used.

Referring to FIG. 8, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 8 illustrates the case in which component carriers have the same bandwidth, the case is purely exemplary, and thus, the component carriers may have different bandwidths. In addition, although FIG. 8 illustrates the case in which the component carriers are adjacent to each other in the frequency domain, FIG. 8 are logically illustrated, and thus, the component carriers may be physically adjacent to each other or may be spaced apart from each other.

Component carriers can use different center frequencies or use one common center frequency with respect to physically adjacent component carriers. For example, in FIG. 8, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

An LTE system may use one downlink component carrier and one uplink component carrier, whereas an LTE-A system may use a plurality of component carriers as illustrated in FIG. 8. In this case, a method for scheduling a data channel by a control channel may be classified into a linked carrier scheduling method and a cross carrier scheduling method.

In more detail, in the linked carrier scheduling method, a control channel transmitted through a specific component carrier schedules only a data channel through the specific component carrier like in a legacy LTE system using a single component carrier.

Meanwhile, in the cross carrier scheduling method, a control channel transmitted through a primary component carrier (primary CC) using a carrier indicator field (CIF) schedules a data channel transmitted through a data channel transmitted through the primary CC, that is, a secondary CC. In addition, the primary CC may also be referred to as a primary cell (PCell) and furthermore, the secondary CC may also be referred to as a secondary cell (SCell).

In a recently discussed enhanced TDD (eTDD) system, uplink/downlink (UL/DL) configuration may be determined a TDD configuration message of a higher layer and may also be reconfigured as necessary. In addition, a purpose of use of some subframes, in particular, a specific subframe of the primary CC or secondary CC may be changed.

Figure 9:
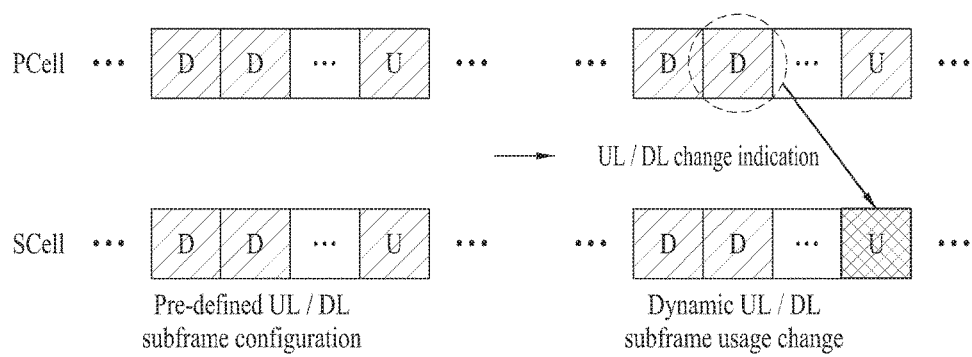
FIG. 9 illustrates an example in which use of a specific subframe is dynamically changed in a wireless communication system to which a carrier aggregation scheme is applied.

FIG. 9 illustrates an example in which use of a specific subframe is dynamically changed in a wireless communication system to which a carrier aggregation scheme is applied.

Referring to FIG. 9, a last subframe of an SCell is originally configured for an uplink subframe, and then, use of the last subframe is changed as a downlink subframe due to increase in downlink traffic, etc.

As such, as an indication method for dynamically changing use of a subframe, one of a system information message, RRC layer signaling, or a physical control channel may be used. In particular, FIG. 9 illustrates the case in which a physical control channel transmitted in a second downlink subframe of a PCell indicates change in use of the subframe.

In an eTDD system in which a plurality of component carriers are aggregated, when use of a subframe of each component carrier, that is, use of uplink/downlink is dynamically changed, the present invention proposes methods for transmitting and receiving signals for supporting this dynamic change.

First Embodiment

As a first method, in order to simplify a dynamic changing operation of use while a plurality of component carriers are present, when use of a specific subframe in a PCell is changed, use of a corresponding subframe in SCells may be limited to be changed together. That is, the SCell may dependently perform the changing operation of use upon the changing operation of use of the PCell, which will be described in more detail hereinafter.

When use of a subframe of a component carrier is dynamically changed, a UE needs to recognize the change in use and to change use of a subframe of the corresponding component carrier to a reception mode (i.e., a downlink subframe) from a transmission mode (i.e., an uplink subframe), or vice versa. In this case, in a situation in which a carrier aggregation scheme is applied, when component carriers having different transmission modes (a downlink subframe or an uplink subframe) are sufficiently spaced apart, that is, in the case of inter-band carrier aggregation, a similar form may be configured as a case in which a downlink band and an uplink band are separated from each other in a frequency division duplex (FDD) system. However, a problem may arise in terms of intra-band carrier aggregation, which will be described with reference to drawings.

Figure 10:
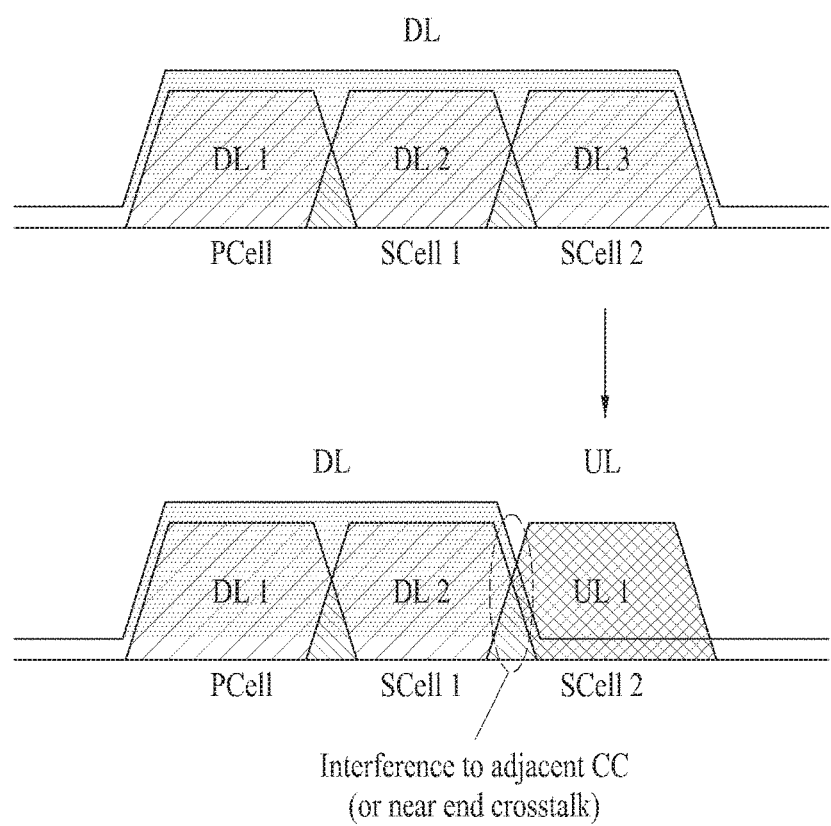
FIG. 10 is a view illustrating a problem that arises when use of a secondary component carrier is changed when an intra-band carrier aggregation scheme is applied.

FIG. 10 is a view illustrating a problem that arises when use of a secondary component carrier is changed when an intra-band carrier aggregation scheme is applied.

Referring to FIG. 10, when the intra-band carrier aggregation scheme is applied, although component carriers are configured with different uses, the component carriers are adjacent to each other without a sufficient duplexing gap and are almost adjacent to each other, a type of near-end crosstalk may occur. Thus, when use of a specific subframe in a PCell is changed, a method for changing use of a corresponding subframe in SCells in the same way is more appropriate for the case in which an intra-band carrier aggregation scheme is applied, and the following method may be applied.

1) In order to recognize change in use of a subframe by a UE, an eNB may use an indicator indicating the change in use of the subframe via RRC layer signaling, etc. The indicator may apply one cell (or component carrier) or a plurality of cells (or component carriers). In general, in order to indicate change in use of a subframe for a plurality of SCells, grouping signaling for cells (or component carriers) using the same indicator is required. For example, when the change in use of a specific subframe of a PCell is also applied in corresponding subframes of all SCells in the same way, all aggregated cells may be grouped to one group and uses of the subframes may be changed together.

2) Assuming that channel measurement operations are independently performed on a radio resource candidate that is fixedly pre-used and a radio resource candidate that can be dynamically changed, the channel measurement operations for a dynamically changed radio resource may be optionally limited only to the case in which the corresponding radio resource is used for downlink. For example, when a method of changing uses of radio resources of SCells that is pre-configured as a group in the same way is applied, if downlink grant for cross carrier scheduling of some (or all) SCells included in a corresponding group is received in an PCell, a UE may assume that radio resources of SCells belonging to the corresponding group are used for downlink resources at a predetermined specific point of time. In this situation, the UE may perform channel estimation on a radio resource of an SCell used for downlink and report corresponding information to an eNB independently (or differently) from a channel estimation result for a fixedly used radio resource.

Second Embodiment

As a second proposed method, use of a specific subframe of each component carrier is independently applied from use of a subframe of a PCell or another SCell. Unlike an intra-band carrier aggregation scheme, in an inter-band carrier aggregation scheme, duplexing interference may not be affected between component carriers having different uplink/downlink subframe configurations, and thus, use of a specific cell (or a component carrier) may be independently changed only when the intra-band carrier aggregation scheme is applied. For convenience of description, it is assumed that use of an SCell is changed to a downlink subframe from an uplink subframe.

First, when the intra-band carrier aggregation scheme is applied, since the aforementioned near-end crosstalk may occur as illustrated in FIG. 10, an operation of changing use of an SCell to downlink use from uplink use may not be supported. In this case, the changing operation of use, signaled to a corresponding UE, may be disregarded. In downlink grant of an SCell, use of which is changed to downlink use, a CIF for cross carrier scheduling may be omitted from a DCI or the CIF may be assumed as a meaningless state and mapped to a virtual CRC value for error detection but not a carrier index.

Here, processing of the virtual CRC value(s) will now be described. When uplink use is frequently changed to downlink use, the possibility that error occurs is high correspondingly to this situation. Thus, when predetermined virtual CRC value(s) is not detected, this may be error-processed. On the other hand, when uplink use is not frequently changed to downlink use, the possibility that error occurs is not high correspondingly to this situation. Thus, this may be error-processed only when predetermined virtual CRC value(s) is detected.

Meanwhile, when an inter-band carrier aggregation scheme is applied, an operation of changing use of an SCell to downlink use from uplink use may be changed. That is, at a specific point of time that is a downlink subframe in a PCell and an uplink subframe in an SCell, an actual intended operation may be an operation of scheduling reception of downlink signals of the SCell through the PCell. In this case, in downlink grant of an SCell, use of which is changed to downlink use, a CIF for cross carrier scheduling is a meaningful value, and thus, it is not necessary to omit the CIF or to use the CIF as a virtual CRC value.

However, since an SCell is originally a subframe used for uplink, uplink grant for the SCell may be transmitted at a previous point of time. Since an eNB pre-recognizes this situation, when uplink grant for an uplink subframe of an SCell is transmitted using a cross carrier scheduling scheme, an CIF for cross carrier scheduling of the SCell may be omitted from DCI or the CIF may be assumed as a meaningless state and mapped to a virtual CRC value for error detection but not a carrier index.

Figure 11:
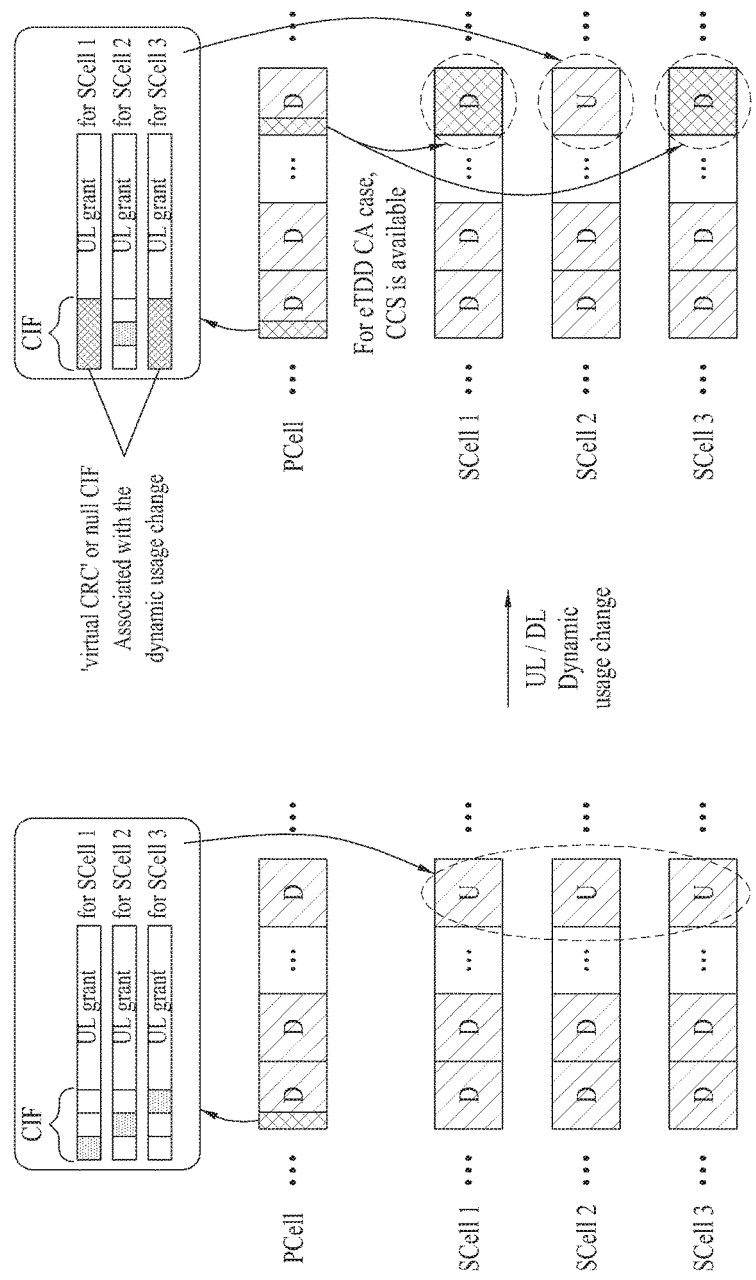
FIG. 11 illustrates an example in which change in use of a subframe of a secondary component carrier is performed according to a second embodiment of the present invention.

FIG. 11 illustrates an example in which change in use of a subframe of a secondary component carrier is performed according to a second embodiment of the present invention. In particular, in FIG. 11, it is assumed that use of last subframes of SCell 1 and SCell 3 are changed to downlink from uplink.

As seen from FIG. 11, uplink grant for an uplink subframe of an SCell is transmitted using a cross carrier scheduling scheme in a first subframe of a PCell prior to change in use. As described above, a CIF may indicate a carrier index of an SCell corresponding to corresponding uplink grant.

However, in order to change use of last subframes of SCell 1 and SCell 3 to downlink from uplink, downlink grant may be transmitted using cross carrier scheduling in a last subframe of a PCell.

As described above, since an eNB pre-recognizes this situation, the eNB may omit a CIF for cross carrier scheduling of SCell 1 and SCell 3 or may assume the CIF as a meaningless state and map the CIP to a virtual CRC value for error detection but not a carrier index during transmission of downlink grant of an uplink subframe of an SCell using a cross carrier scheduling scheme in a first subframe of a PCell.

As such, when a PDSCH as a downlink data channel in an uplink subframe of an SCell is transmitted, a start symbol of the corresponding PDSCH may be basically determined as a predefined symbol via a physical layer, a higher layer, etc. or may be a predetermined value using an implicit method, but is not limited thereto. For example, in the case of a PDSCH transmitted in a subframe used for uplink of an SCell, PDSCH data may be allocated from a symbol that can be allocated in a subframe or a first symbol. As another example, a method for signaling a start symbol of a PDSCH in an uplink subframe or determining a symbol index may be separately defined.

Third Embodiment

When use of an uplink subframe is changed to a downlink subframe irrespective of whether a carrier aggregation scheme is applied, a corresponding uplink subframe may be present as a subframe for SRS transmission. Since the SRS is a signal transmitted with a predetermined period, when the SRS cannot be transmitted as expected, this can affect channel quality measurement of a UE, etc. Accordingly, a third embodiment of the present invention proposes a method for minimizing influence due to collision between an uplink subframe for transmitting the SRS and a downlink subframe for transmitting a PDSCH.

FIG. 12 is a diagram for explanation of processing of an SRS when use of a subframe is changed according to a third embodiment of the present invention.

A) First, an SRS to be transmitted in an SCell may be dropped in a corresponding subframe and may be operated only in a downlink subframe for receiving a PDSCH scheduled in a PCell. In this case, SRS transmission is delayed as illustrated in FIG. 12(a). In this regard, the SRS may be transmitted in a valid uplink subframe that is first generated after the SRS is dropped even if a next expected SRS is transmitted, or a dropped SRS may be disregarded and an SRS may be transmitted according to a next SRS transmission period. This method can be considered in both a periodic SRS and an aperiodic SRS. However, in reality, a transmission point of time of the periodic SRS is determined in consideration of channel state measurement of a UE and next scheduling, and thus, it is not preferable that an SRS used as the periodic SRS is dropped and then delayed an retransmitted. In this case, it is more preferable that change in use of a subframe is detected and then transmission of the periodic SRS is stopped and SRS configuration is newly formed.

A method for dropping an SRS and transmitting an SRS after the corresponding point of time is more appropriate for the aperiodic SRS. When the aperiodic SRS is an SRS that is transmitted once, the SRS is transmitted at a next uplink transmission point of time when change in use is detected, a transmission point of time is indicated via a physical layer or higher layer signaling, or the SRS is transmitted using a method that is implicitly predefined. When the aperiodic SRS is transmitted a plurality of number of times, the SRS can be applied in a similar way as the periodic SRS. That is, the SRS may be transmitted in a valid uplink subframe that is first generated after use of a subframe is changed or transmitted at a next SRS transmission period, or next SRS transmission may be stopped.

B) Alternatively, some symbols of a subframe may be empty in consideration of SRS transmission and only the remaining regions may be used as a downlink data region as illustrated in FIG. 12(b). An allocated signal may be rate-matched according to the size of resource in order to allocate resource in a reduced downlink data region or punctured for dropping some symbols of an end portion of a subframe after resource allocation.

In this case, a subframe is divided into two regions of a downlink region and an SRS. However, in reality, a guard period may be used between the downlink region and the SRS to minimize influence of switching for converting downlink into uplink (e.g., downlink data loss or uplink transmission delay in a switching point of time, interference between adjacent symbols due to this). When the guard period is used, a similar structure as the TDD special subframe shown in FIGS. 12(c) and 12(d) may be obtained.

In more detail, one symbol prior to an SRS is a guard period as illustrated n FIG. 12(c) and a last symbol of a subframe may be used as an SRS, which is achieved by considering that a legacy SRS signal is designed according to the size of one symbol and a minimum value of a guard period is defined as a size corresponding to about 1 symbol in a TDD special subframe.

Although a downlink region can be sufficiently achieved using the above method, when overhead is very large due to other signals except for data, for example, a PDCCH, a reference signal, etc., if two symbols are punctured or rate-matched as described above, performance may be seriously degraded. Accordingly, when the guard period and the size of the SRS need to be more reduced, it can be considered that both the guard period and the SRS region are considered in one symbol. For example, half a symbol may be used like a second configuration of FIG. 12(c) and an SRS corresponding to the size of the half the symbol may be designed to be transmitted to the remaining half the symbol.

In addition, when use of an uplink subframe in which the SRS is transmitted is changed to use of a subframe for PDSCH and SRS transmission, a method of indicating the change in a special subframe as illustrated in FIG. 12(d) but not in a downlink subframe may also be considered.

For example, when one symbol is allocated to each of the guard period and the SRS, the same configuration is used as special subframe configuration #4 (both DL/UL) in the case in which downlink and downlink are a normal CP or special subframe configuration #3 in the case in which downlink and downlink are an extended CP in Table 1 above. In addition, when two symbols are used for two symbols, the same configuration is used as special subframe configuration #3 in the case in which downlink and downlink are a normal CP or special subframe configuration #2 in the case in which downlink and downlink are an extended CP. Accordingly, a new subframe configuration may be defined in consideration of a CP length of downlink and uplink, a guard period, an SRS symbol, etc. and pre-signaled via RRC layer signaling.

The above methods associated with SRS transmission of an uplink subframe, the use of which is changed to downlink, may be combined and used according to a method for embodying an eTDD system, except that the corresponding subframe is used for only downlink. In addition, priority may be defined according to use of a subframe. For example, when priority for PDSCH transmission is configured to be higher than priority for SRS transmission, if a subframe for transmitting a PDSCH and a subframe for transmitting an SRS collide with each other, PDSCH transmission with higher priority may be performed.

Fourth Embodiment

Meanwhile, when a specific uplink subframe of an SCell is changed to a downlink subframe in a PCell, if reception of a corresponding changing indicator fails, a UE cannot accurately recognize use of the corresponding subframe, that is, the UE cannot recognize a boundary of a subframe, the use of which is changed to downlink from uplink, and thus, reception of downlink data fails. In order to prevent this case, the UE needs to indicate a response signal for reception of the changing indicator, for example, ACK/NACK. For example, when the changing indicator is signaled at a point of time in which uplink signaling is transmitted, the UE may transmit the response signal to reception of the changing indicator through a PUCCH resource of a PCell associated with the corresponding uplink grant.

Figure 13:
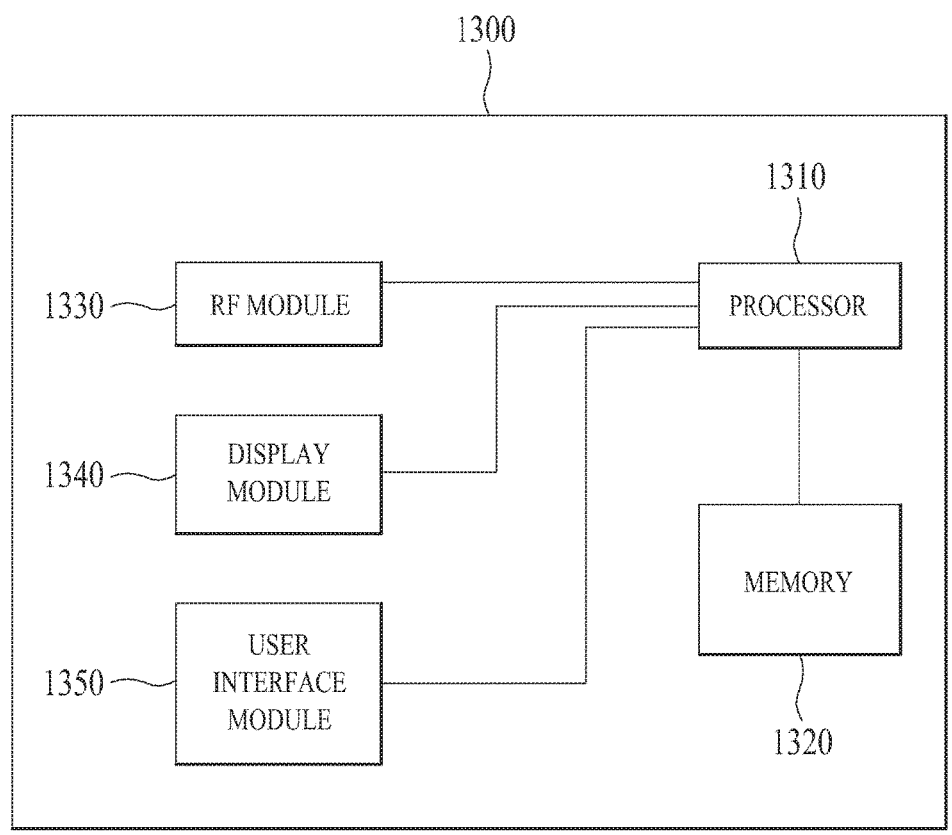
FIG. 13 is a block diagram of a structure of a communication device according to an embodiment of the present invention.

FIG. 13 is a block diagram of a structure of a communication device 1300 according to an embodiment of the present invention.

Referring to FIG. 13, the communication device 1300 includes a processor 1310, a memory 1320, an RF module 1330, a display module 1340, and a user interface module 1350.

The communication device 1300 is illustrated for convenience of description and some modules may not be omitted. The communication device 1300 may further include necessary modules. In addition, some modules of the communication device 1300 may be subdivided. The processor 1310 is configured to perform operations according to the embodiment of the present invention that is exemplified with reference to the diagrams. In detail, a detailed operation of the processor 1310 would be understood with reference to FIGS. 1 to 12.

The memory 1320 is connected to the processor 1310 and stores an operating system, an application, a program code, data, etc. The RF module 1330 is connected to the processor 1310 and converts a baseband signal into a radio signal or converts a radio signal into a baseband signal. To this end, the RF module 1330 performs analog conversion, amplification, filtering, and frequency up-conversion, or inverse procedures thereof. The display module 1340 is connected to the processor 1310 and displays various pieces of information. The display module 1340 may use, but is not limited to, well-known elements such as a liquid crystal display (LCD), a light emitting diode (LED), and an organic light emitting diode (OLED). The user interface module 1350 may be connected to the processor 1310 and may include a combination of well-known user interfaces such as keypads, touchscreens, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

The embodiments of the present invention may be achieved by various means, for example, hardware, firmware, software, or a combination thereof. In a hardware configuration, the methods according to exemplary embodiments of the present invention may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although the aforementioned method and apparatus for transmitting and receiving a signal based on dynamic change in radio resources in a wireless communication system to which a carrier aggregation scheme is applied has been described in terms of an example applied to a $3^{rd}$ generation partnership project (3GPP) long term evolution (LTE) system, the method and apparatus can be applied to various wireless communication systems as well as to the 3GPP LTE system.

The invention claimed is:

1. A method for communicating with a base station at a user equipment (UE) in a Time Division Duplex (TDD) communication system, the method comprising:
    configuring subframe configuration according to a first subframe configuration defining subframe usages for each of subframes included in one radio frame,
    wherein a first subframe included in one radio frame is set as an uplink subframe based on the first subframe configuration, and
    wherein a sounding reference signal (SRS) is allocated in the first subframe based on the first subframe configuration; and
    re-configuring the subframe configuration from the first subframe configuration to a second subframe configuration,
    wherein the first subframe included in one radio frame is changed to a downlink subframe from the uplink subframe based on the re-configured second subframe configuration, and
    wherein the allocated SRS in the first subframe is dropped and a position corresponding to the dropped SRS in the first subframe is used for downlink when the first subframe is changed to the downlink subframe from the uplink subframe.

2. The method of claim 1, wherein information on the first subframe configuration is received via a system information message from the base station.

3. The method of claim 1, wherein the number of downlink subframes indicated by the second subframe configuration are greater than a number of downlink subframes indicated by the first subframe configuration.

4. The method of claim 1, wherein the subframe usages comprise the downlink subframe, the uplink subframe and a special subframe.

5. The method of claim 1,
    wherein the uplink subframe and the changed downlink subframe are included in a secondary serving cell.

6. The method of claim 5,
wherein a physical downlink shared channel in the downlink subframe of the secondary serving cell is scheduled in a primary serving cell.

7. A user equipment (UE) in a Time Division Duplex (TDD) communication system, the user equipment comprising:
a radio frequency module for transmitting and receiving signals with a base station; and
a processor for processing the signals,
wherein the processor is configured to:
set subframe configuration according to a first subframe configuration defining subframe usages for each of subframes included in one radio frame,
wherein a first subframe included in one radio frame is set as an uplink subframe based on the first subframe configuration, and
wherein a sounding reference signal (SRS) is allocated in the first subframe based on the first subframe configuration, and
re-set the subframe configuration from the first subframe configuration to a second subframe configuration,
wherein the first subframe included in one radio frame is changed to a downlink subframe from the uplink subframe based on the re-set second subframe configuration, and
wherein the allocated SRS in the first subframe is dropped and a position corresponding to the dropped SRS in the first subframe is used for downlink when the first subframe is changed to the downlink subframe from the uplink subframe.

8. The UE of claim 7, wherein information on the first subframe configuration is received via a system information message from the base station.

9. The UE of claim 7, wherein the number of downlink subframes indicated by the second subframe configuration are greater than a number of downlink subframes indicated by the first subframe configuration.

10. The UE of claim 7, wherein the subframe usages comprise the downlink subframe, the uplink subframe and a special subframe.

11. The UE of claim 7,
wherein the uplink subframe and the changed downlink subframe are included in a secondary serving cell.

12. The UE of claim 11,
wherein a physical downlink shared channel in the downlink subframe of the secondary serving cell is scheduled in a primary serving cell.

* * * * *